United States Patent [19]

Smith

[11] 4,212,106
[45] Jul. 15, 1980

[54] MULTI-DIAMETER, HEMISPHERE, CENTER-OF-HOLE LOCATING PROBE

[76] Inventor: Harry M. Smith, 1093 Norfolk Dr., San Jose, Calif. 95129

[21] Appl. No.: 952,519

[22] Filed: Oct. 18, 1978

[51] Int. Cl.² .......................... G01B 3/22; G01B 5/12
[52] U.S. Cl. ............................ 33/172 D; 33/172 B; 33/173; 33/178 B
[58] Field of Search ............. 33/147 H, 147 J, 147 K, 33/148 F, 169 C, 172 D, 172 B, 174 R, 178 B, 173

[56] References Cited

U.S. PATENT DOCUMENTS

| | | | |
|---|---|---|---|
| 1,157,389 | 10/1915 | Hess | 33/178 B |
| 1,264,519 | 4/1918 | Hinson | 33/178 B |
| 2,437,190 | 3/1948 | Gale | 33/169 C |
| 2,911,727 | 11/1959 | Steinhart | 33/169 C |
| 3,864,834 | 2/1975 | Horton | 33/172 B |

OTHER PUBLICATIONS

Carrico et al., "Caliper for Measuring Center-to-Center Distances of Holes", W. Elect. Tech. Dig. No. 14, 4-1969, p. 3.

Primary Examiner—Richard R. Stearns
Attorney, Agent, or Firm—John L. McGannon

[57] ABSTRACT

A multi-diameter centering probe having a spherical outer surface portion for insertion into a hole whose spacing from another hole is to measured. The member is formed of a one-piece construction for attachment to an automatic reversing dial test indicator when the measurement is to be taken from a relatively high friction measuring device, such as a vernier, dial, or electronic height gage. The probe can be attached directly to relatively low friction measuring devices, such as air-bearing height gages or measuring machines. A preferred embodiment of the member uses a number of integral, substantially hemispherical sections integral with each other and extending longitudinally of the central axis of the body so that the smallest section is at one end of the body and the largest section is at the opposite end of the body, the sections of intermediate diameter being between the two end sections.

7 Claims, 3 Drawing Figures

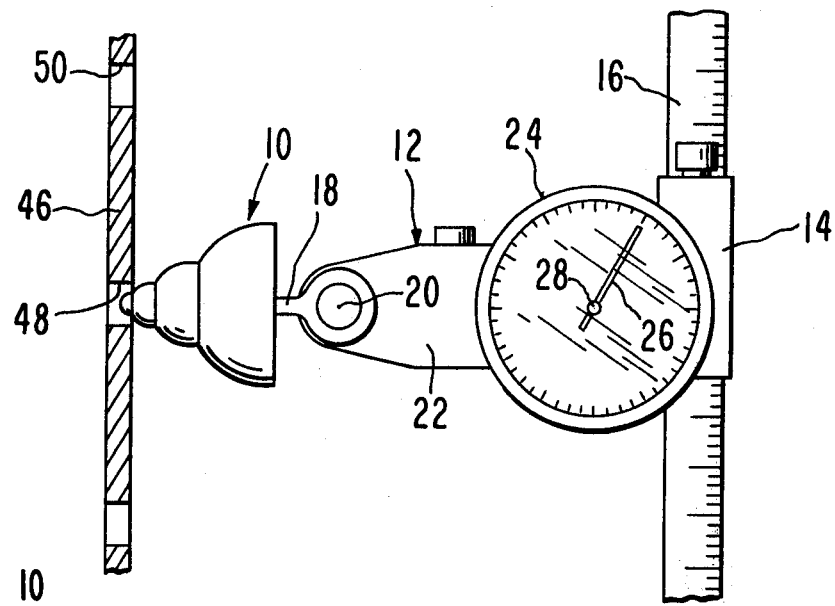
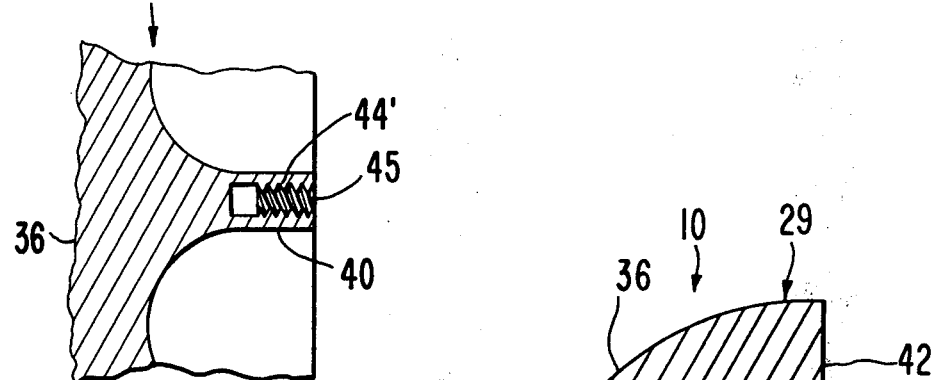
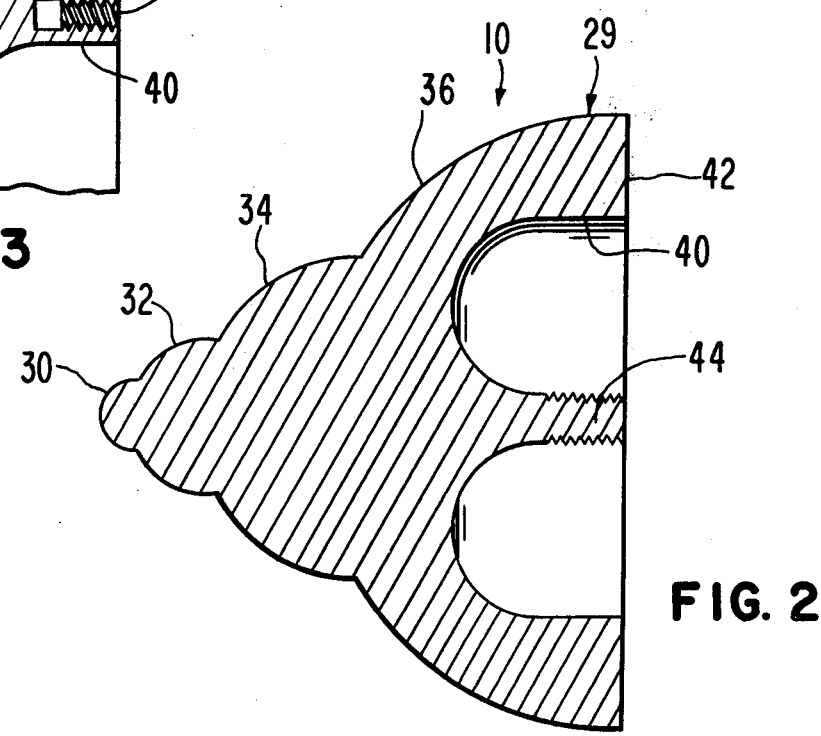

MULTI-DIAMETER, HEMISPHERE, CENTER-OF-HOLE LOCATING PROBE

This invention relates to improvements in the measuring of center-to-center distances between pairs of holes in a workpiece and, more particularly, to an improved contact member or probe for connection to an automatic reversing dial test indicator for insertion into holes whose spacings are to be measured by high friction vernier, dial, or electronic height gages or by low friction measuring devices, such as air-bearing height gages and measuring machines.

BACKGROUND OF THE INVENTION

Historically, to obtain center-distance measurement between holes, or from an edge to the center of a hole, was to zero-in the top and the bottom of the hole to obtain the diameter of the hole. Since the center is the midpoint of the diameter, the calculation is divided by two to get the true center in one axis. To measure in the other axis the workpiece is flipped over 90 degrees, and the operation is repeated.

Efforts to eliminte the above calculations in locating the center of a hole have resulted in the use of contact members in the form of "wedges" or cones. However, these members must enter the hole squarely to get an accurate reading, an almost impossible feat to accomplish with the unaided eye, resulting in one edge being closer to the center than the other.

A sphere is the only geometric shape which has all points on its surface equidistant to the center. Balls have been used in the past to locate the center of holes, particularly the center of the outer edge of chamferred holes, but because of friction in non-floating height gages, this method does not work satisfactorily. However, the recent introduction of the automatic reversing dial test indicator, which is almost frictionless, makes it easy to zero-in on the center in one axis if this axis is at zero, then with a ball, the other axis is at zero, and the workpiece needs only to be flipped over to measure its location in the other plane.

This friction in the sliding, and consequently the measuring feature of these gages has given rise to the use of air-bearings, both in height gages and in measuring machines. Air-bearing, or "frictionless" measuring devices do use ball-probes. Added to this, there is always the strong possibility of interjecting errors when points of reference are changed, or when probes are changed, not to mention the loss in time in making probe changes.

Great care must be exercised in building air-bearing measuring devices. Not only must tight tolerances be specified, but also flatness and squareness, and as a result these measuring devices are quite expensive. Air-bearing height gages require a "squareing fixture" when mounting "wedges" or cones. This fixture alone is as expensive as the best automatic reversing dial test indicator, which most shops already have.

SUMMARY OF THE INVENTION

The present invention provides an improved contact member or probe for an automatic reversing dial test indicator wherein the contact member has a spherical outer surface portion for entrance into a pair of holes whose spacing is to be measured. Thus, the use of the contact member will assure an accurate "zero reading" at all times and one that can be relied upon to provide a precision measurement of the spacing between the two holes when measuring with either high or low friction measuring devices.

To this end, the contact member or probe of the present invention includes a one-piece body having means thereon for connecting the same to the finger of an automatic reversing dial test indicator or directly onto low friction measuring devices. A preferred embodiment of the contact member uses a number of integral, hemispherical sections which extend longitudinally of each other along an axis common to all sections and have respective outer, spherical surface portions whose diameters decrease progressively from one end of the body to the opposite end. In this way, the contact member can be suitable for use with the measurement of holes spacing where the holes have diameters falling within a wide range of values. For instance, the holes can be less than ⅛" or slightly less than 1", assuming that the diameter of the smallest section is ⅛" and the diameter of the largest section is b 1" and intermediate sections having diameters of, for instance, ¼" and ½".

The contact member or probe can be quickly and easily mounted on the pivotal finger of an existing automatic reversing dial test indicator or directly onto a low-friction measuring device and does not require modification of the indicator or measuring device to effect this purpose. The contact member can be made of a hard material to withstand abrasion so that it is highly resistant to surface damage which might occur as it engages a workpiece.

Theoretically, a ball will find a hole eventually, no matter how small the hole may be, but from a practical standpoint the hole should be at least one half the diameter of the ball. Since hole sizes do vary, the contact member has hemispheres in increments of half-sizes all attached to a common centerline. The contact member is made hollow to reduce weight so the contact member will not sag under its own weight.

The primary object of this invention is to provide an improved contact member or probe for an automatic reversing dial test indicator or low-friction measuring device whereby the indicator or measuring device can provide more accurate reading of the measurement of the distance between pairs of holes than has been possible with the use of conventional contact members on indicators or measuring devices of this type.

Another object of this invention is to provide a contact member for an indicator of the type described wherein the contact member has a spherical outer surface rather than a wedge or conical-shaped surface so that squareness of entry of the probe into a hole whose spacing from another hole is to be measured is not required to thereby assure an accurate spacing measurement even though the contact member does not enter the hole precisely in axial alignment with the central axis of the hole.

Another object of this invention is to provide a contact member for an indicator of the type described wherein the contact member has a number of spherical surface segments of different diameters thereon so that the contact member can be used for measuring the spacing between holes whose diameters fall within a wide range of values.

Other objects of this invention will become apparent as the following specification progresses, reference being had to the accompanying drawing for an illustration of the invention.

IN THE DRAWING:

FIG. 1 is a side elevational view of an automatic reversing dial test indicator using the improved contact member of the present invention, showing the contact member about to be inserted into a hole of a workpiece;

FIG. 2 is an enlarged cross-sectional view of the contact member; and

FIG. 3 is a fragmentary, cross-sectional view similar to FIG. 2 but showing another embodiment of the contact member.

The contact member or probe of the present invention is broadly denoted by the numeral 10 and is adapted to be used with a conventional automatic reversing dial test indicator 12 which, as is well known, is shiftably carried by a tubular bracket 14 on a calibrated bar 16. Indicator 12 has a rotatable finger 18 which rotates about an axis 20 perpendicular to the base 22 of the indicator to indicate an off-center condition of a contact member carried on the outer end of the finger. This off-center condition is sensed by the pivotal movement of the finger about axis 20 and this pivotal movement is transmitted to and indicated by a dial 24 having a needle 26 rotatable about an axis 28. All of the foregoing is conventional in construction and forms no part of the present invention except as to the way in which it is used with the improved contact member 10 of the invention.

Contact member 10, as shown in FIG. 2 has a body 29 provided with number of sections 30, 32, 34 and 36 integral with each other and formed from a suitable metal, such as a hard steel. Each of the sections has a spherical outer surface portion and is generally hemispherical except at the outer extremity thereof, where the next adjacent section is integral therewith. For instance, section 30 is integral with section 32; section 32 is integral with section 34; and section 34 is integral with section 36.

The diameters of the sections vary by certain amounts. For instance, the diameter of section 30 is selected as ⅛"; section 32 having a diameter of ¼"; section 34 has a diameter of ½"; and section 36 has a diameter of 1". Thus, contact member 10 is suitable for use in measuring center-to-center distances of holes in the range of less than ⅛" to slightly less than 1". All of the sections have a common axis, and the various sections are at respective locations along the axis.

Contact member 10 can be mounted on finger 18 in any suitable manner. For purposes of illustration, contact member 10 is hollowed out to reduce its weight and to present a recess defined at its outer boundary by a generally cylindrical inner surface 40 on body 29, surface 40 extending inwardly from the flat face 42 adjacent to the hollowed out portion. Surface 40 surrounds a central projection 44 which is externally threaded to threadably receive a tubular portion (not shown) on the outer end of finger 18. In the alternative, projection 44' could have an internally threaded bore 45 (FIG. 3) for receiving the externally threaded outer end of finger 18.

In use, contact member 10 is mounted on finger 18 so that it is rigidly secured thereto. Then, indicator 12 is used in the usual manner, such as by shifting it along bar 16 and causing contact member 10 to enter a hold of a workpiece 46, such as hole 48. For purposes of illustration, hole 48 has a diameter slightly less than that of section 32; thus, this section is used to determined the reference point in measuring the distance to a second hole 50 of workpiece 46.

While contact member 10 is shown as having four different sections of different outer diameters, it is clear that it could be used with a single section or with two, three or more than four sections if desired. Any suitable means for connecting the contact member to finger 18 can be used in lieu of using the connection means shown in FIG. 2.

The present invention provides a number of advantages. For instance, contact member 10 does not require squareness of entry into the holes whose spacing is to be measured. Thus, it is superior to the conventional wedge or cone designs which have been used for contact members in the past. The contact member can be quickly and easily mounted on existing indicators and requires no modification of such an indicator to render it suitable for use with the contact member of this invention.

I claim:

1. A contact member for use with a device for measuring the space between a number of holes in a workpiece comprising: an elongated body having a control axis and a number of sections provided with respective, generally spherical outer surface portions of different diameters, each section being generally hemispherical in cross-section; and means on the body at one end thereof and centrally located relative to said central axis for connecting the body to a measuring device.

2. A contact member as set forth in claim 1, wherein said connecting means comprises an externally threaded projection.

3. A contact member as set forth in claim 1, wherein said connecting means comprises a projection having an internally threaded bore extending thereinto.

4. A contact member as set forth in claim 1, wherein the said sections having a common central axis.

5. A contact member as set forth in claim 1, wherein the sections are integral with each other so that the body is of a one-piece construction.

6. A contact member as set forth in claim 1, wherein the body has a generally flat end face and a recess extending into the body from said face thereof to present a generally cylindrical inner surface defining the outer boundry of the recess, there being a projection centrally disposed within the recess and coaxial with the central axis of the body, said projection forming said connecting means and being threaded for threadably connecting it to the measuring device.

7. A contact member for use with a device for measuring the spaces between a number of holes in a workpiece comprising: an elongated body of one-piece construction having a central axis and a number of generally hemispherical sections integral with each other, said sections being arranged in end-to-end relationship with respect to each other and concentric to said central axis of the body, each section having a generally spherical outer surface portion of a diameter different from the outer surface portion of the section adjacent thereto, the section having the smallest diameter being at one end of the body and the section having the largest diameter being at the opposite end of the body; and means on said opposite end of the body and concentric to the central axis for connecting the body to a measuring device.